(12) United States Patent
Stecher et al.

(10) Patent No.: US 11,384,503 B2
(45) Date of Patent: Jul. 12, 2022

(54) FOUNDATION FOR A WINDMILL

(71) Applicant: HOLCIM TECHNOLOGY LTD., Zug (CH)

(72) Inventors: Arne Stecher, Holderbank (CH); Christian Schuldt, Holderbank (CH)

(73) Assignee: HOLCIM TECHNOLOGY LTD, Zug (CH)

( * ) Notice: Subject to any disclaimer, the term of this patent is extended or adjusted under 35 U.S.C. 154(b) by 33 days.

(21) Appl. No.: 17/259,853

(22) PCT Filed: Jul. 9, 2019

(86) PCT No.: PCT/IB2019/055822
§ 371 (c)(1),
(2) Date: Jan. 12, 2021

(87) PCT Pub. No.: WO2020/012345
PCT Pub. Date: Jan. 16, 2020

(65) Prior Publication Data
US 2021/0222389 A1     Jul. 22, 2021

(30) Foreign Application Priority Data

Jul. 13, 2018 (AT) .................................. A 207/2018

(51) Int. Cl.
*E02D 27/42* (2006.01)
*F03D 13/20* (2016.01)
*E04H 12/22* (2006.01)

(52) U.S. Cl.
CPC ....... *E02D 27/425* (2013.01); *E04H 12/2269* (2013.01); *F03D 13/22* (2016.05); *E02D 2200/1685* (2013.01)

(58) Field of Classification Search
CPC .......... E02D 27/425; E02D 2200/1685; F03D 13/22; E04H 12/2269
See application file for complete search history.

(56) References Cited

U.S. PATENT DOCUMENTS 8,695,297 B2 *   4/2014   Knisel ..................... F03D 13/22
                                                               52/294
9,534,405 B1 *   1/2017   Phuly ........................ E04C 5/08
(Continued)

FOREIGN PATENT DOCUMENTS

DE     10 2013 226536 A1    6/2015
WO     WO 2004/101898 A2   11/2004
(Continued)

OTHER PUBLICATIONS

International Search Report as issued in International Patent Application No. PCT/IB2019/055822, dated Oct. 22, 2019.

*Primary Examiner* — Andrew J Triggs
(74) *Attorney, Agent, or Firm* — Pillsbury Winthrop Shaw Pittman LLP

(57) ABSTRACT

A foundation for a windmill includes an annular pedestal, which is divided into several ring sections and is composed of prefabricated concrete elements, the pedestal including a platform for a windmill tower and several support elements extending radially outward from the pedestal, wherein the pedestal is supported by strut ribs on the support elements, wherein the pedestal, at its end forming the platform, includes a circumferential projection extending radially outward from the pedestal and including at least one channel for receiving a tensioning cable, the channel being provided in the projection and extending in the circumferential direction.

20 Claims, 4 Drawing Sheets

(56) References Cited

U.S. PATENT DOCUMENTS

| | | | |
|---|---|---|---|
| 9,937,635 B2* | 4/2018 | Phuly | E04G 21/02 |
| 9,938,685 B2* | 4/2018 | Krause | E04B 1/215 |
| 10,260,480 B2* | 4/2019 | Beramendi Ortega | E02D 5/223 |
| 10,648,187 B2* | 5/2020 | Phuly | E04G 21/12 |
| 10,724,204 B2* | 7/2020 | Schuldt | F03D 13/20 |
| 10,876,269 B2* | 12/2020 | Schuldt | E02D 27/425 |
| 10,934,679 B2* | 3/2021 | Schuldt | E02D 27/425 |
| 10,968,592 B2* | 4/2021 | Schuldt | E02D 27/425 |
| 2017/0030045 A1 | 2/2017 | Krause et al. | |
| 2021/0180282 A1* | 6/2021 | Schuldt | E02D 27/425 |
| 2021/0222389 A1* | 7/2021 | Stecher | F03D 13/22 |

FOREIGN PATENT DOCUMENTS

| | | |
|---|---|---|
| WO | WO 2011/030199 A2 | 3/2011 |
| WO | WO 2016/112376 A1 | 7/2016 |
| WO | WO 2018/055446 A1 | 3/2018 |

* cited by examiner

FOUNDATION FOR A WINDMILL

CROSS-REFERENCE TO RELATED APPLICATIONS

This application is the U.S. National Stage of International Application Serial No. PCT/IB2019/055822, filed Jul. 9, 2019, which in turn claims priority to Austrian Application No. A 207/2018, filed Jul. 13, 2018. The contents of all of these applications are incorporated herein by reference in their entirety.

The invention relates to a foundation for a windmill comprising an annular pedestal, which is divided into several ring sections and is composed of prefabricated concrete elements, said pedestal comprising a platform for a windmill tower and several support elements extending radially outward from the pedestal, wherein the pedestal is supported by strut ribs on the support elements.

The invention also relates to a windmill with a windmill tower comprising a rotor, the windmill tower being mounted on a foundation.

In WO 2004/101898 A2 a foundation for a windmill is disclosed. As described there, a high level of manual and administrative effort is required for the manufacture of the foundation for onshore windmills, and the manufacture is very time-consuming. In view of the increasing dimensions of modern windmills, the foundation is exposed to very high loads and must be dimensioned accordingly. Today's windmills have a tower with a height of up to 150 m and generate up to 6 MW. In the majority of cases, the tower or mast of windmill is made of reinforced concrete and is built using prefabricated concrete elements. Alternatively, the windmill tower also be formed from a steel structure.

Prior to the introduction of foundations made of prefabricated concrete elements, the foundations for windmills were essentially created by excavating an excavation, introducing a granular substructure, erecting a foundation component, performing the necessary formwork and reinforcement work and then filling the excavation with in-situ concrete, wherein the concrete was transported to the work site as ready-mixed concrete by truck mixers and poured into the excavation. The central foundation component usually has a hollow cylindrical configuration and has generally been prefabricated and transported as a unit to the respective assembly location.

The production of a windmill foundation using in-situ concrete is associated with a number of disadvantages. It requires complex logistics for planning the manufacturing activities at the construction site, and it involves time-consuming and costly operations at the construction site with regard to the erection of the formwork and the reinforcement structure, as well as the transport and pouring of the concrete. This is especially true given that more than 1000 $m^3$ of concrete may be required for large foundations.

In order to improve the construction process of a foundation, it has already been proposed in WO 2004/101898 A2 to build the foundation using prefabricated concrete elements. Such concrete elements are manufactured in a precast concrete plant and transported to the work site, where they are brought into position using a crane and then connected together. In this way, the duration of the construction process on the job site can be reduced considerably. When connected to one another, the prefabricated concrete elements form a foundation with a central annular pedestal and several support elements, each of which protrudes radially outward from the pedestal. Each prefabricated concrete element forms one of the support elements and an associated ring section of the pedestal. The ring sections of the pedestal connected to one another by screwed flanges. As described in WO 2004/101898 A2, the prefabricated concrete elements can be steel-reinforced. After the foundation has been formed, the tower or mast of the windmill is erected on the pedestal and fastened to the pedestal with anchor bolts.

By using prefabricated concrete elements, production can take place in a controlled environment so that the quality of the hardened concrete can be improved. From a financial point of view, the molds used in a prefabrication plant can be reused many times before they have to be replaced, so the cost of the mold or casing per unit is lower than if it is made with in-situ concrete, which every time requires the erection of a specific formwork. The formwork can be used several times, but has to be transported from place to place and cleaned accordingly.

Wind turbines are exposed to loads and stresses of a specific nature that have to be absorbed by the foundation. The wind itself acts in an unpredictable and variable way. On the other hand, with ever larger systems, dynamic load components act on the structure as a result of vibrations and resonances. Furthermore, towers with a height of 100 meters and more transfer considerable eccentric loads to the foundation as a result of the tilting moment that occurs. The concrete of the foundation has to withstand a compression that occurs in the compressed zone, and the reinforcement structure of the concrete has to absorb the tensile forces in the opposite part of the foundation, because the concrete itself has a relatively low tensile strength. Foundations made of prefabricated reinforced concrete elements have the advantage that the performance and quality of the concrete, as well as the quality of the production, especially the post-processing and hardening process, are higher, so that there is a lower risk of cracking and a higher resistance to dynamic and static loads. This is especially true because the hardening of the concrete takes place under controllable conditions and therefore there is no risk related to weather conditions on the construction site.

While the use of prefabricated concrete elements has a number of advantages over pouring a foundation from in-situ concrete, the joining of the prefabricated concrete elements to form the finished foundation, which is done by screwing flanges to the ring sections of the pedestal, is considered to be in need of improvement. Sometimes foundations for large wind power plants comprise a pedestal made of twelve or sixteen or more ring sections so that the individual prefabricated concrete elements can remain small enough for transport with conventional trucks. As a result, hundreds of screws have to be set to produce the foundation, which is naturally time-consuming and requires a very precise initial positioning of the concrete elements to be connected to one another in order to be able to insert the screw bolts into the corresponding holes on the flanges.

The invention is therefore based on the object of improving a foundation of the type mentioned at the outset in such a way that the assembly of the ring sections to form the finished foundation can be less time-consuming than assembly by screwing and that no great accuracy is required when aligning the concrete elements with one another before joining them.

To solve this problem, a foundation of the type mentioned at the outset is further developed according to the invention in such a way that the annular pedestal, at its end forming the platform, comprises a circumferential projection extending radially inward from the pedestal and comprising at least one channel for receiving a tensioning cable, said channel being provided in the projection and extending in the circumferential direction.

The fact that a circumferential projection is created, which extends radially outwardly from the pedestal and is attached in the upper area, i.e. at the end having the platform of the pedestal, allows to do without screwing the prefabricated concrete elements, because at least one tensioning cable, but usually a plurality of tensioning cables for tensioning the prefabricated concrete elements in the upper region of the foundation can be guided over a relatively large circumference. A tensioning cable routed over a large circumference can develop a better tensioning and joining force than tensioning cables that run on a small circumference, so that the measure according to the invention achieves highly efficient tensioning of the prefabricated concrete elements. As a result, the screwing of the concrete elements can largely or completely be dispensed with. For the introduction and tensioning of the tensioning cables, it is sufficient if the prefabricated concrete elements are positioned as close as possible to one another at the desired location, without the need for precise alignment of the drill holes with one another. The tensioning cable or the plurality of tensioning cables can then be inserted into the channel running in the projection and pulled together. The prefabricated concrete elements are pulled together and aligned with one another and the finished foundation is obtained without any screw connections.

Additional bracing in the upper area of the foundation can take place if the pedestal at its end forming the platform has a circumferential projection extending radially inward from the pedestal with at least one channel provided in the projection and running in the circumferential direction for receiving a tensioning cable, as in correspondence with a preferred embodiment of the present invention. The tensioning cables in the inner projection are less favorable for exerting a tension force due to the smaller circumference than those in the aforementioned outer projection, but a tensioning cable or a plurality of tensioning cables in this projection nevertheless contributes to a not inconsiderable extent to the overall strength of the foundation and can therefore advantageously be used in connection with the present invention.

According to a preferred embodiment of the present invention, the support elements have at least one channel running in the circumferential direction for receiving a tensioning cable. The support elements, like the external projection, extend outward from the pedestal and can therefore also contain cable ducts for tensioning cables, which, due to the relatively large circumference, can exert a very high tension force on the pedestal assembled from the prefabricated concrete elements or on the foundation. The at least one channel for receiving a tensioning cable is therefore, within the scope of the present invention, an ideal addition to the at least one circumferential channel for receiving a tensioning cable provided in the outside circumferential projection.

To further increase the strength of the foundation assembled according to the invention without or largely without screw connections, it is provided according to a preferred embodiment of the present invention that the support elements of adjacent ring sections bear against one another in a radially inner area. The support elements resting against one another, i.e. the side surfaces resting against one another, can absorb high frictional forces and thus contribute significantly to the overall strength of the foundation according to the invention. This is especially true when the support elements have at least one channel running in the circumferential direction for receiving a tensioning cable, as described above. Tensioning cables in the support elements press them against one another with great force and in this way generate surface pressure between the support elements, which stabilize the entire foundation. For the support elements of adjacent ring sections to rest against one another in an inner area, the support elements are designed in such a way that they have the width of the pedestal section at their origin on the pedestal or pedestal section and the width increases steadily according to the opening angle, which results from the division of 360° through the number of ring sections of the foundation.

Finally, and according to a preferred embodiment of the present invention, the support elements extend radially outward from the end of the pedestal opposite the platform, and the pedestal, at its end having the support elements, comprises a circumferential projection extending radially inward from the pedestal and comprising at least one channel provided therein for receiving a tensioning cable, said channel extending in the circumferential direction. The tensioning cables in the inner projection are less favorable for exerting a tension force due to the smaller circumference than those in the aforementioned outer projection or than those in the support elements, but a tensioning cable or a plurality of tensioning cables in this projection nevertheless contributes to a not inconsiderable extent to the overall strength of the foundation and can therefore advantageously be used in connection with the present invention.

A further preferred embodiment of the invention provides that channels are additionally provided in the circumferential projection that extends radially inwardly from the platform end of the pedestal, wherein said channels extend in the axial direction of the annular pedestal and are provided for receiving anchoring means for anchoring of the windmill tower on the pedestal, in particular in the form of anchor bolts and/or tensioning cables. The anchor bolts are usually intended for fastening a tower designed as a steel structure. The cable lead throughs are usually intended for the attachment of concrete towers.

Preferably, a ring section and at least one support element extending radially outwardly from the ring section with a strut rib are formed in one piece as a prefabricated concrete element. According to this preferred embodiment of the present invention, such a prefabricated concrete element is produced by casting and obtained directly from the casting mold. This represents a simplification of the manufacturing process compared to a process in which several concrete parts have to be put together.

The invention is preferably developed in such a way that a ring section comprises at least two support elements extending radially outward from the ring section, each with a strut rib. Such a one-piece ring section of the foundation according to the invention can, for example, describe a quarter circle and have the corresponding number of support elements with primary strut ribs. If the finished foundation is to have eight support elements, for example, a one-piece circumferential section of the base, which describes a quarter circle, has two support elements with correspondingly two primary strut ribs.

In order to be able to easily tension the tension cables when assembling the foundation according to the invention, the foundation according to the invention is preferably developed in such a way that the channels running in the circumferential direction are accessible through recesses for receiving tensioning means for tensioning cables. The recesses are accordingly provided in the respective structures of the ring sections which, as described above, have the channels for the tensioning cables. The respective channel is accessible in the area of these recesses and thus a cable can be inserted into the channel at the recesses and pushed in until the cable emerges from the channel on the other side and protrudes into the recess. The cable is then tensioned with the aid of a tensioning mechanism and the ends are fixed with a tensioning means, for example a turnbuckle.

According to a preferred embodiment of the present invention, the recesses for receiving tensioning means for tensioning cables are formed from recesses provided at the edge on adjacent ring sections. A recess is thus formed by two partial recesses on ring sections coming to lie adjacent in the foundation according to the invention, which is advantageous in the context of the present invention because the production of an edge recess in prefabricated concrete elements is easier to accomplish than the production of a recess that is completely enclosed by the prefabricated concrete part, since a prefabricated concrete part with an edge recess can be removed from the mold more easily.

The present invention is advantageously developed in such a way that the platform has depressions for receiving wall elements of a windmill tower and/or for receiving an adapter for the assembly of a windmill tower. The wall elements of the windmill tower, which can be shaped to form towers with round or polygonal cross-sections, are secured to the pedestal in a form-fitting manner with this preferred measure. If a suitable adapter is inserted into the depressions in the frontal platform, a steel tower in particular can be erected on the adapter, the adapter also allowing height adjustment to a maximum permitted construction height of the windmill.

The prefabricated concrete elements are preferably made of reinforced concrete which has a reinforcement structure, in particular reinforcement elements, profiles, rods or wires, which are embedded in the prefabricated concrete elements and/or which are designed as tensioning elements for tensioning the prefabricated concrete elements together to form prestressed concrete elements.

According to a preferred embodiment, the present invention is further developed in that a connecting structure is provided which extends between opposing prefabricated concrete elements, in particular in the form of tensioning cables, in particular with the interposition of at least one circular tensioning element. Such a connecting structure is intended as a supplement to the circumferential tensioning cables and connects opposite prefabricated concrete elements directly by radial bracing through the center of the foundation. Here, a circular tensioning element in the form of a tensioning plate can be interposed, on which radially extending tensioning cables can be fixed and tensioned. This connection structure can be formed in the area of the end of the pedestal that forms the platform and/or in the area of the end of the pedestal that has the support elements.

In order to close the cavity within the pedestal at its bottom, the pedestal consisting of a base ring and a mounting ring, a preferred embodiment of the present invention provides that the circumferential projection extending radially inward at the end of the pedestal opposite the platform has an inner step to support a base plate. A circular edge is thus formed which circumferentially supports a central base plate, which is arranged on the base of the pedestal.

According to a preferred embodiment of the present invention, a base plate has one or more concrete structures for fastening auxiliary installations for the windmill, in particular depressions for receiving wall elements and elevations as foundations.

The concrete used for the manufacture of the precast concrete elements can be of any type that is also typically used for the pouring of concrete at the point of use. In addition to aggregates and water, concrete contains cement as a hydraulic binder.

Fiber-reinforced concrete can also be used to make the prefabricated concrete elements. The fibers can be made from any fiber material that helps increase the structural integrity, particularly strength, impact resistance and/or durability, of the resulting concrete structure. Fiber-reinforced concrete contains short discrete reinforcement fibers that are evenly distributed and randomly oriented.

The reinforcing fibers are preferably carbon fibers, synthetic fibers and, in particular, polypropylene fibers. Alternatively, the reinforcing fibers can be steel fibers, glass fibers or natural fibers. The use of HPC (High Performance Concrete) and UHPC (Ultra High Performance Concrete) is also possible. These types of concrete are extremely fine binders with special, extremely fine aggregates and corresponding additives and are to be regarded as advantageous due to their relatively low weight.

The windmill according to the invention with a windmill tower comprising a rotor is mounted on a foundation as described above and can therefore be erected quickly and inexpensively. In addition, the foundation according to the invention can be dismantled relatively easily, so that dismantling is possible with reasonable effort.

The invention is explained in more detail below with reference to an embodiment shown in the drawing. In the drawing.

Figure 1:
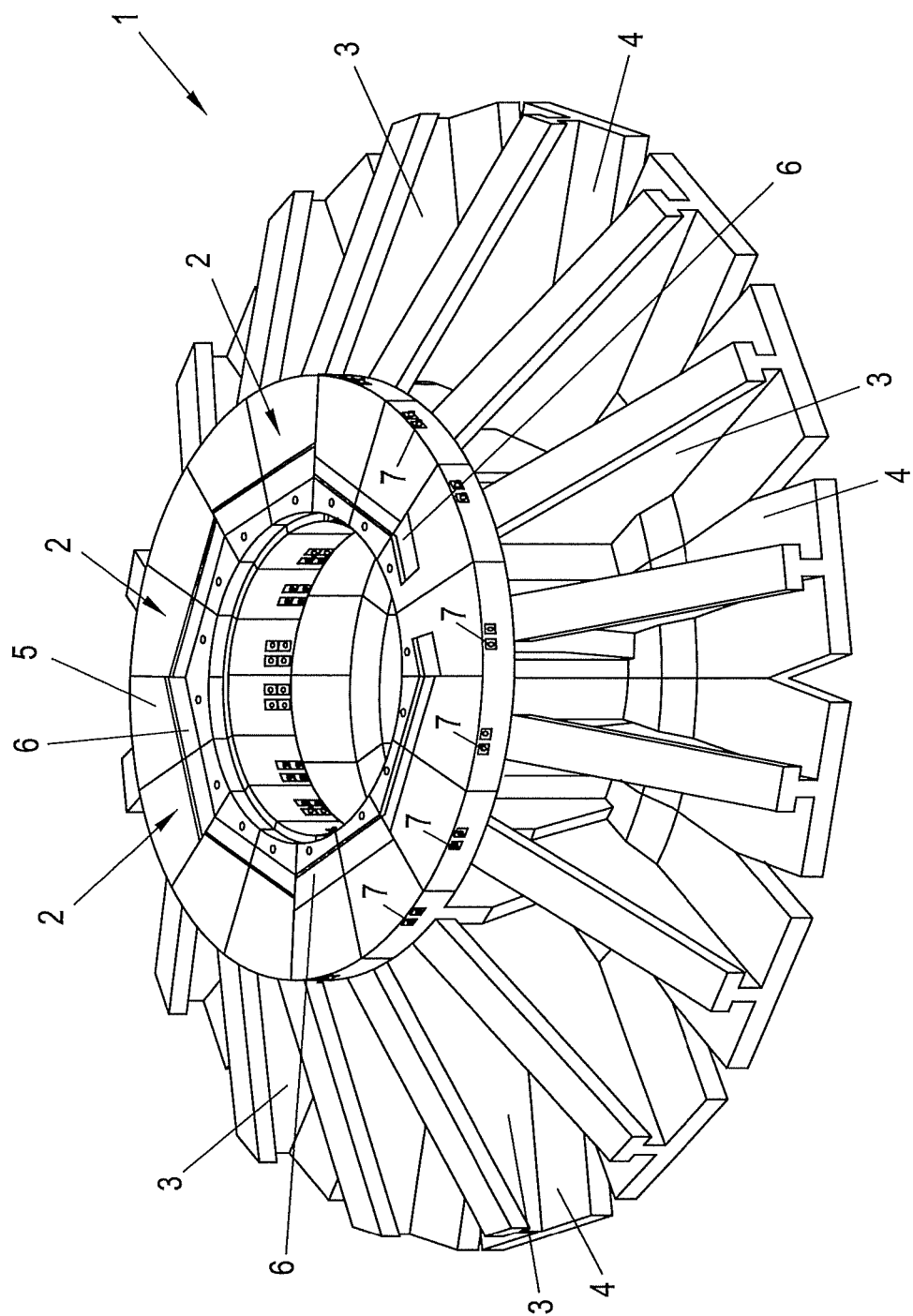
FIG. 1 is a perspective view of the foundation according to the invention.

In FIG. 1, the foundation according to the invention is designated generally by the reference number 1. The foundation 1 is composed of a plurality of prefabricated concrete elements of the same type, each of which has a ring section 2 which is supported by strut ribs 3 on support elements 4. The ring sections 2 together form a pedestal. In the example shown in FIG. 1, the annular pedestal has a circular cross-section, but the cross-section can also have other geometries and in particular be polygonal. Differences between the concrete elements can be seen in the area of the frontal platform 5 for a windmill tower, not shown, on which depressions 6 are provided for receiving wall elements of a windmill tower. The prefabricated concrete elements consist of reinforced concrete which comprises a reinforcement structure, in the present case in the form of tensioning elements 7 for clamping the prefabricated concrete elements together to form stressed concrete elements. The tensioning elements 7 consist of tie rods which are put under tension at the ends with screws in order to tension the concrete. In an inner area A, the support elements 4 of adjacent concrete elements rest against one another and are thus supported against one another. If the foundation is clamped together by tensioning cables, large frictional forces can be transmitted in this way, which counteract any displacement of the concrete elements against each other.

Figure 2:
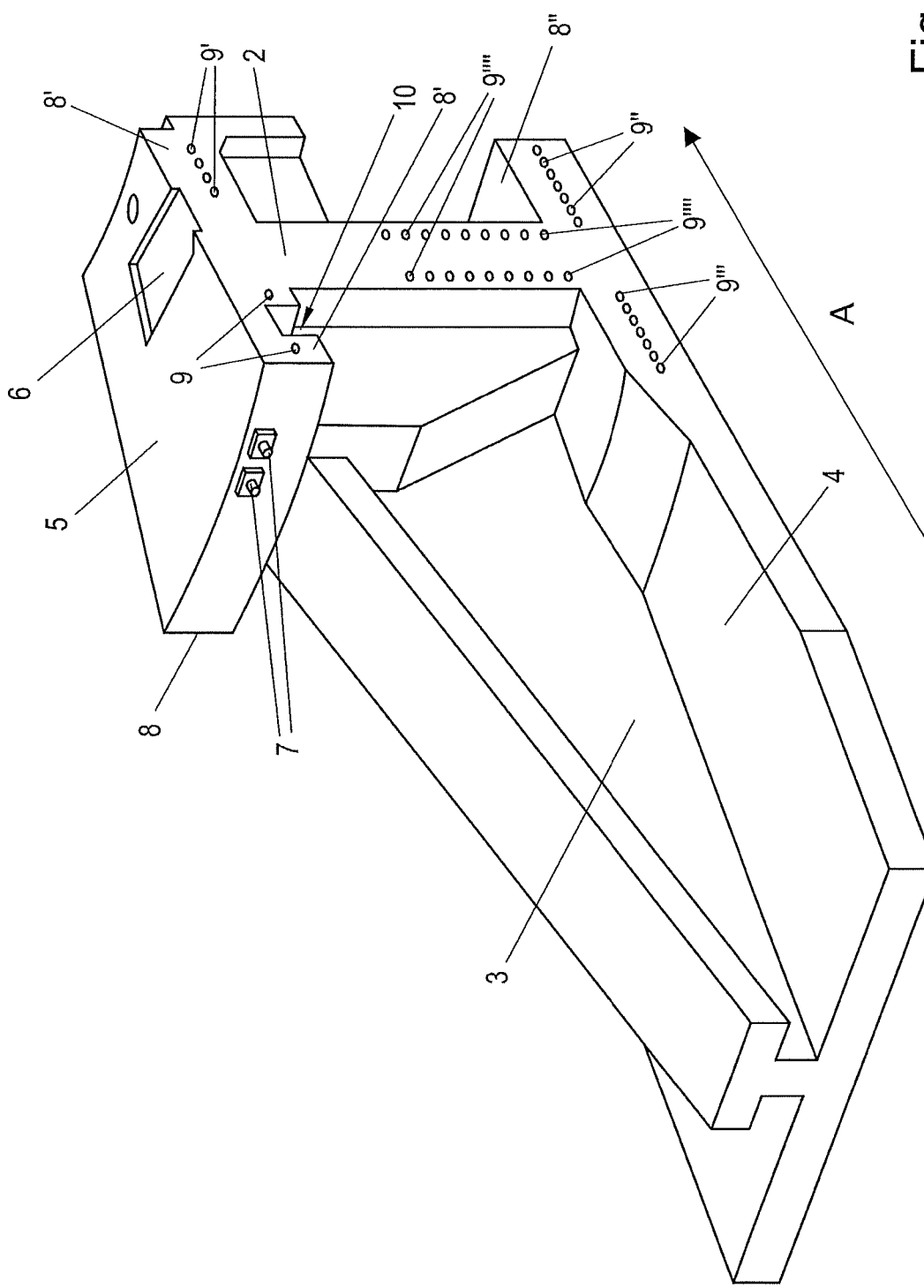
FIG. 2 shows a perspective view of an individual ring section of the foundation according to the invention.

In the illustration according to FIG. 2, it can be seen that the concrete element comprises a circumferential projection 8 extending radially outward from the ring section 2 at its end forming the platform 5. The projection 8 is penetrated by a plurality of channels 9 for receiving tensioning cables which, when the foundation is assembled, form a circumferential cable channel in which a tensioning cable can run over a relatively large circumference around the central ring in order to tension the concrete elements. With 10 an edge recess for receiving tensioning means (not shown) for tensioning cables is referred to, which in the present case makes three channels 9 accessible for receiving tensioning cables. The three channels 9 lead into the body of the projection 8 at the bottom of the recess 10, which cannot be seen in FIG. 2. On other concrete elements, the recess 10 is located in a radially further inward or further outward position in order to make the other channels 9 accessible for tensioning means. Additional channels 9', 9" and 9'" are provided in the projection 8' extending inwardly from the end forming the platform and in the projection 8" extending radially inwardly from the end having the support elements and in the support element 4, to accommodate tensioning cables so that the foundation can be assembled from the ring sections 2 consisting of prefabricated concrete elements without screwing. For the same purpose, the ring section 2 has further channels 9"".

Figure 3:
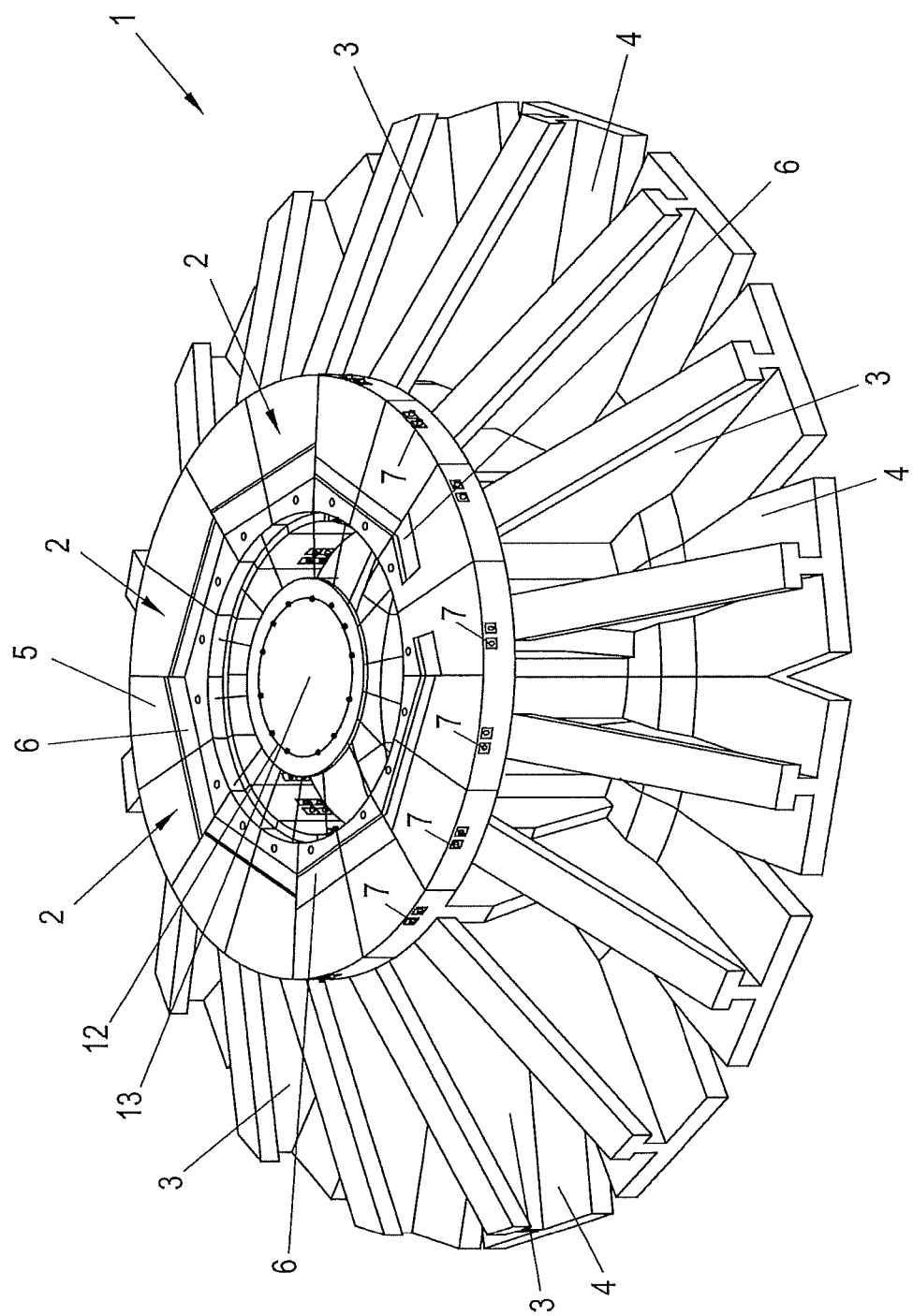
FIG. 3 shows a perspective view according to FIG. 1 supplemented by an additional connection structure with a clamping plate and FIG. 4 shows a perspective view according to FIG. 1 supplemented by an adapter for the assembly of a windmill tower.

In FIG. 3, the same parts are provided with the same reference numerals and it can be seen that an additional connection structure is provided in the form of tensioning cables 12, which connect opposing prefabricated concrete elements of the foundation 1 with one another by tensioning cables 12 running in the radial direction. The tensioning cables 12 extend with the interposition of a circular tensioning element or tensioning plate 13 between opposite prefabricated concrete elements of the foundation 1 and can be fixed and tensioned on the same. A similar connection structure can be provided in the area of the end of the pedestal having the support elements 4.

Figure 4:
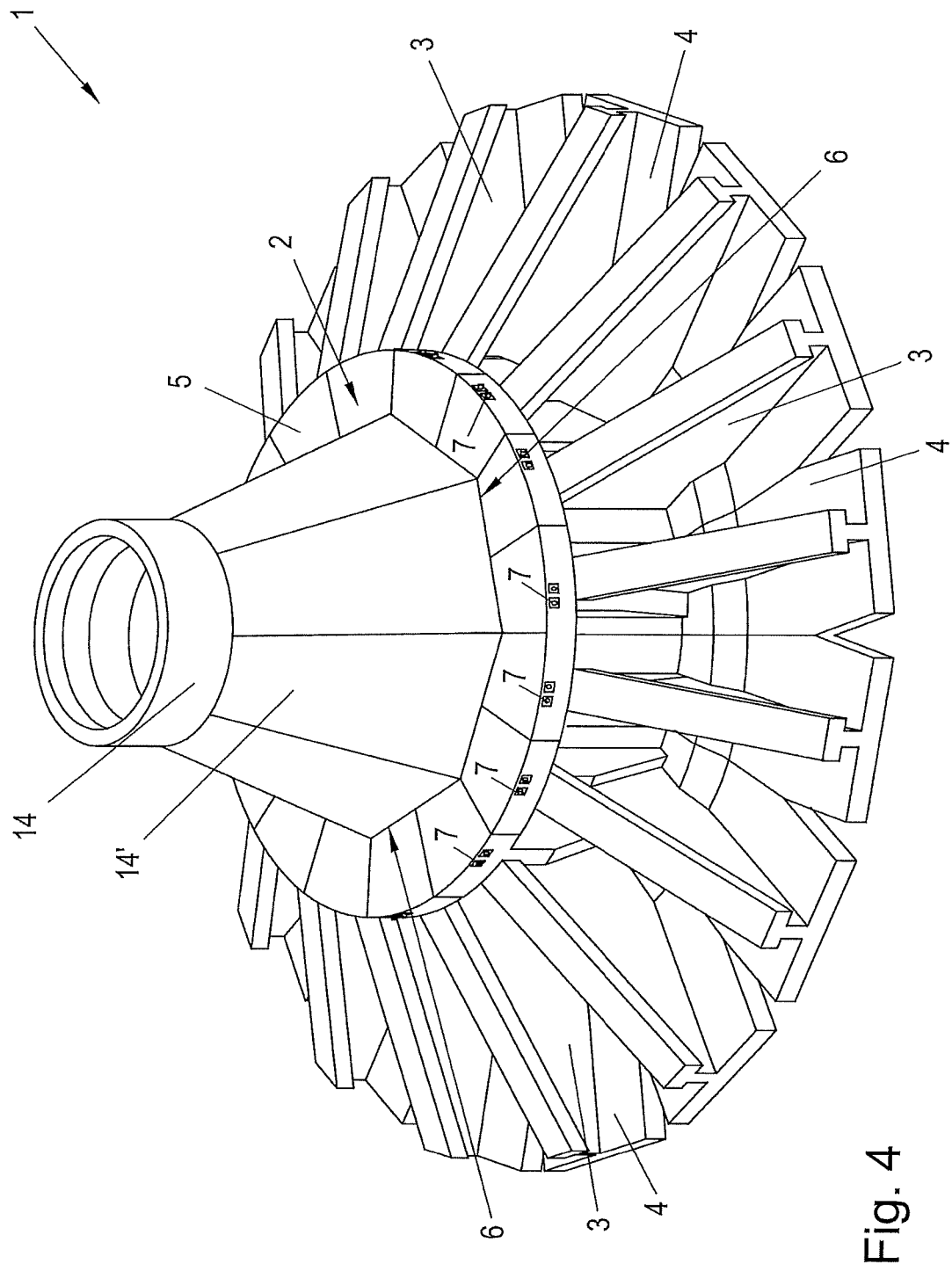

In FIG. 4, the same parts are again provided with the same reference numerals and it can be seen that an adapter 14 for the assembly of a windmill tower with suitable wall elements 14' can be received in the depressions 6 of the frontal platform 5. With such an adapter 14, for example, a steel tower can also be mounted particularly easily on the foundation 1 according to the invention. In addition, the adapter 14 can be produced in different height increments in order to allow the height of the windmill to be adapted to a maximum approved height if corresponding masts are only available in a few, roughly graduated height variants.

The invention claimed is:

1. Foundation for a windmill comprising an annular pedestal, which is divided into several ring sections and is composed of prefabricated concrete elements, said pedestal comprising a platform for a windmill tower and several support elements extending radially outward from the pedestal, wherein the pedestal is supported by strut ribs on the support elements, wherein the pedestal, having an end forming the platform, comprises a circumferential projection extending radially outward from the pedestal and comprising at least one channel for receiving a tensioning cable, said channel being provided in the projection and extending in the circumferential direction.

2. The foundation according to claim 1, wherein the annular pedestal, at the end forming the platform, comprises a circumferential projection extending radially inward from the pedestal and comprising at least one channel for receiving a tensioning cable, said channel being provided in the projection and extending in the circumferential direction.

3. The foundation according to claim 2, wherein additional channels are provided in the circumferential projection that extends radially inwardly from the platform end of the pedestal, wherein said channels extend in the axial direction of the annular pedestal and are provided for receiving anchoring means for anchoring of the windmill tower on the pedestal.

4. The foundation according to claim 3, wherein the anchoring means for anchoring of the windmill tower on the pedestal are in the form of anchor bolts and/or tensioning cables.

5. The foundation according to claim 1 wherein the support elements have at least one circumferential channel for receiving a tensioning cable.

6. The foundation according to claim 1 wherein the support elements of adjacent ring sections bear against one another in a radially inner region.

7. The foundation according to claim 1 wherein the support elements extend radially outward from the end of the pedestal opposite the platform, and the pedestal, at its end having the support elements, comprises a circumferential projection extending radially inward from the pedestal and comprising at least one channel provided therein for receiving a tensioning cable, said channel extending in the circumferential direction.

8. The foundation according to claim herein the circumferential projection extending radially inward from the end of the pedestal that comprises the support elements, has an inner step for supporting a base plate.

9. The foundation according to claim 8, wherein the base plate comprises one or more concrete structures for fastening auxiliary installations for the windmill.

10. The foundation according to claim 9, wherein the one or more concrete structures include depressions for receiving wall elements and elevations as foundations.

11. The foundation according to claim 1 wherein a ring section and at least one support element extending radially outwardly from the ring section with a strut rib are formed in one piece as a prefabricated concrete element.

12. The foundation according to claim 1 wherein a ring section comprises at least two support elements extending radially outwardly from the ring section, each support element having a strut rib.

13. The foundation according to claim 1, wherein the at least one channel is accessible through recesses for receiving tensioning means for tensioning cables.

14. The foundation according to claim 13, wherein the recesses for receiving tensioning means for tensioning cables are formed from recesses provided at the edge on adjacent ring sections.

15. The foundation according to claim 1 wherein the platform has depressions for receiving wall elements of a windmill tower and/or for receiving an adapter for the assembly of a windmill tower.

16. The foundation according to claim 1 wherein the prefabricated concrete elements consist of reinforced concrete which has a reinforcement structure.

17. The foundation according to claim 16, wherein the reinforcement structure includes reinforcement elements, profiles, rods or wires, which are embedded in the prefabricated concrete elements and/or which are designed as tensioning elements for tensioning the prefabricated concrete elements together to form prestressed concrete elements.

18. The foundation according to claim 1 wherein a connecting structure is provided which extends between opposing prefabricated concrete elements.

19. The foundation according to claim 18, wherein a connecting structure is in the form of tensioning cables, optionally with the interposition of at least one circular tensioning element.

20. Windmill with a windmill tower comprising a rotor, the windmill tower being mounted on a foundation according to claim 1.

* * * * *